United States Patent [19]

Taylor

[11] 4,003,563
[45] Jan. 18, 1977

[54] SPRING ASSEMBLY AND ELEMENTS
[75] Inventor: George E. Taylor, Wood Dale, Ill.
[73] Assignee: Nachman Corporation, Des Plaines, Ill.
[22] Filed: Sept. 4, 1975
[21] Appl. No.: 610,106
[52] U.S. Cl. .................................. 267/100; 5/248; 5/259 B; 5/263; 267/91
[51] Int. Cl.² .................... F16F 3/02; A47C 23/02
[58] Field of Search ................ 267/91, 92, 93, 94, 267/95, 96, 97, 98, 99, 100, 101, 102; 5/248, 252, 256, 261, 263, 264 R, 267, 351, 257, 259, 270; 292/452

[56] References Cited
UNITED STATES PATENTS

| | | | |
|---|---|---|---|
| 1,659,255 | 2/1928 | Gail | 5/259 B |
| 2,077,497 | 4/1937 | Stevens | 5/259 R |
| 3,855,651 | 12/1974 | Larkin | 5/248 |

FOREIGN PATENTS OR APPLICATIONS 1,125,607  3/1962  Germany ................ 5/259

Primary Examiner—James B. Marbert
Attorney, Agent, or Firm—McDougall, Hersh & Scott

[57] ABSTRACT

A spring assembly in which use is made of a grid of crisscrossing wires which extend through a plastic button at their cross-over points to intertie the wires in a manner to prevent relative movements without metal to metal contact and in which the buttons embody grooves dimensioned to receive terminal portions of spring members for suspending the spring members therefrom in the assembled relation.

14 Claims, 8 Drawing Figures

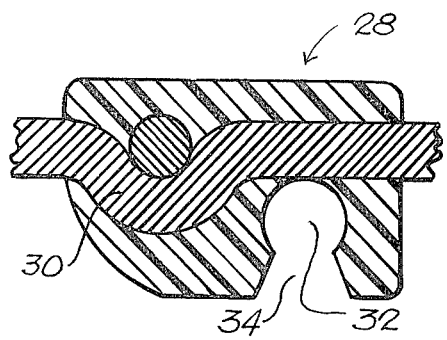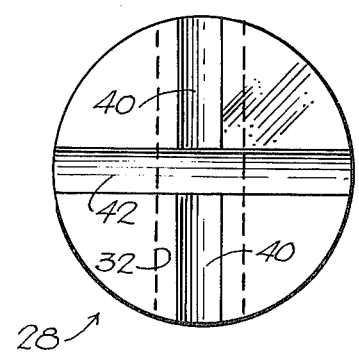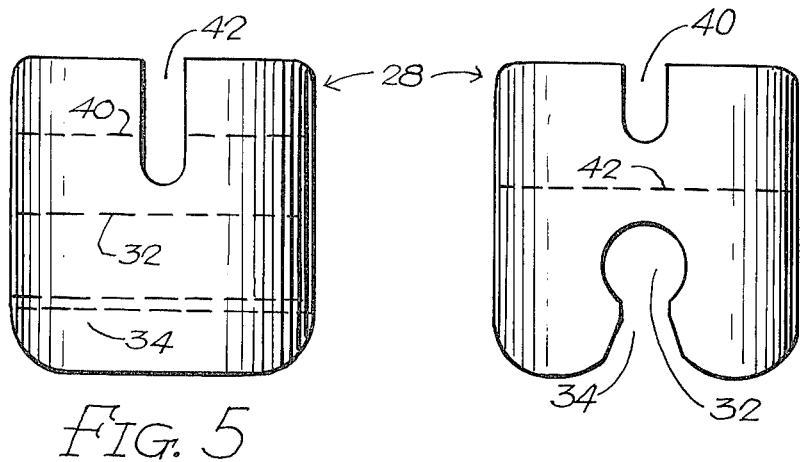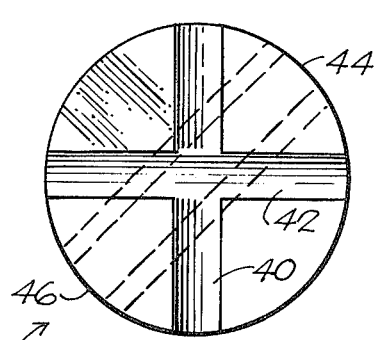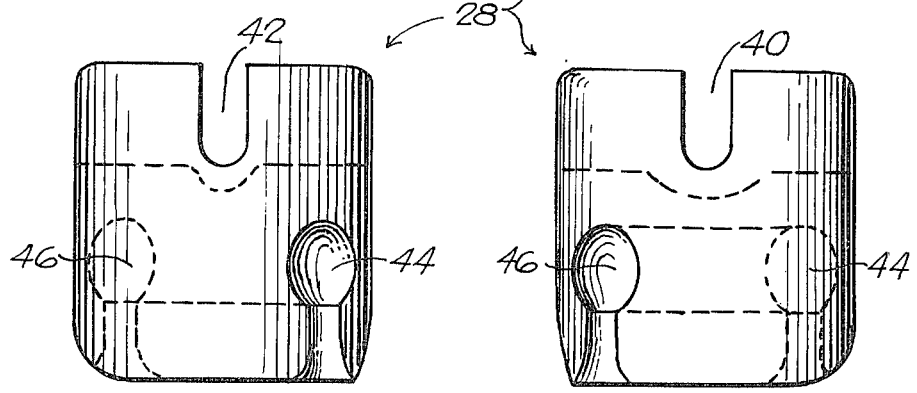

SPRING ASSEMBLY AND ELEMENTS

This invention relates to a spring assembly for box springs, mattresses and the like pieces of bedding and furniture and it relates more particularly to elements to be used in the manufacture of same.

In spring assemblies, used in the manufacture of box springs, mattresses and seats and backing for chairs, couches and other pieces of furniture, use is often made of a plurality of spring members arranged in various patterns, such as in crosswise and lengthwise rows. Spring elements making up such spring assemblies may comprise coil springs formed of spring wire into a number of coils to hourglass, cylindrical, or conical shape, torsion springs such as formed of a band of U-shaped spring wire members joined at their inner ends by one or more loops from which the U-shaped portions extend at an included angle of about 75°–85°. Use can be made of a combination of such coil and torsion springs in making up a spring assembly.

Means are provided to secure such spring members in the desired arrangement in the lengthwise and crosswise extending rows. One such means, which is quite universally employed, comprises a grid work formed of wire which is adapted to overlie the terminal portions of the spring members and to which the terminal coils of the coil springs or the upper bail portion of the torsion springs are attached to suspend the spring members from the grid in the desired arrangement. The lower end portion of the spring elements may be secured to another wire grid, or to slats which extend crosswise between the frame members, or the multiple coil springs may be maintained in the desired arrangement by tie wires which extend crosswise between the terminal coils of the coil springs in the rows, or the coil springs may be housed in pockets formed of a textile fabric, in an arrangement referred to as a marshal unit, wherein the fabric retains the coil springs in the desired arrangement, without metal to metal attachment.

This invention is concerned with the wire grid and a new and improved means for attachment of spring elements thereto. Heretofore such wire grid members have been formed of a plurality of lengthwise and crosswise extending wires in spaced parallel relation to define a grid work. The wires are joined at their cross-over points, as by welding, to secure the wires in their assembly. The need to secure the wires by welding has prevented the use of high carbon steels or spring steels in the manufacture of said grid, and the metal to metal contact has introduced a number of undesirable characteristics in use, such as noise generation, failure of the weld at the joints, and the need to make use of special tools for welding at the many cross-over points of the grid work.

Aside from the many undesirable characteristics of a grid of the type described, means for attachment of the spring elements to the grid work is laborious, time consuming and often requires special equipment and skilled labor, with corresponding increase in the cost of the assembly. Further, the means for attachment of the spring elements to the grid work includes metal clips and the like which again require special tools and skilled labor and makes available the aggravating situation of noise generation in response to metal to metal contact during flexure of the spring.

It is an object of this invention to produce and to provide a method for producing a spring assembly of the type described in which the wires at the cross-over points of the grid are joined one to another in a manner that militates against relative movement and without metal to metal contact, thereby to enable the grid work to be formed of high carbon steel or spring steel; in which the means for joining the wires at their cross-over points also embodies means for attachment of the spring elements to the grid thereby to avoid metal to metal contact, and in which the said means enables interengagement of the spring members with the grid in a simple and efficient manner which does not require the use of jigs or special tools or skilled labor and from which the elements can be removed for replacement or repair, and in which the spring elements can be assembled in a manner to be retained by the grid work in the desired crosswise and lengthwise arrangement while performing other functions in the final assembly of the spring unit.

These and other objects and advantages of this invention will hereinafter appear, and for purposes of illustration, but not of limitation, embodiments of the invention are shown in the accompanying drawings in which FIG. 1 is a top plan view of a corner portion of a spring assembly embodying the features of this invention;

FIG. 3 is a sectional view taken along the line 3—3 of FIG. 2;

FIG. 4 is a front elevational view of a modification in a retainer embodying the features of this invention;

FIG. 5 is a side elevational view of the retainer shown in FIG. 4;

FIG. 6 is a front elevational view of a still further modification of the retainer;

FIG. 7 is a side elevational view of the retainer of FIG. 6; and

Figure 1:
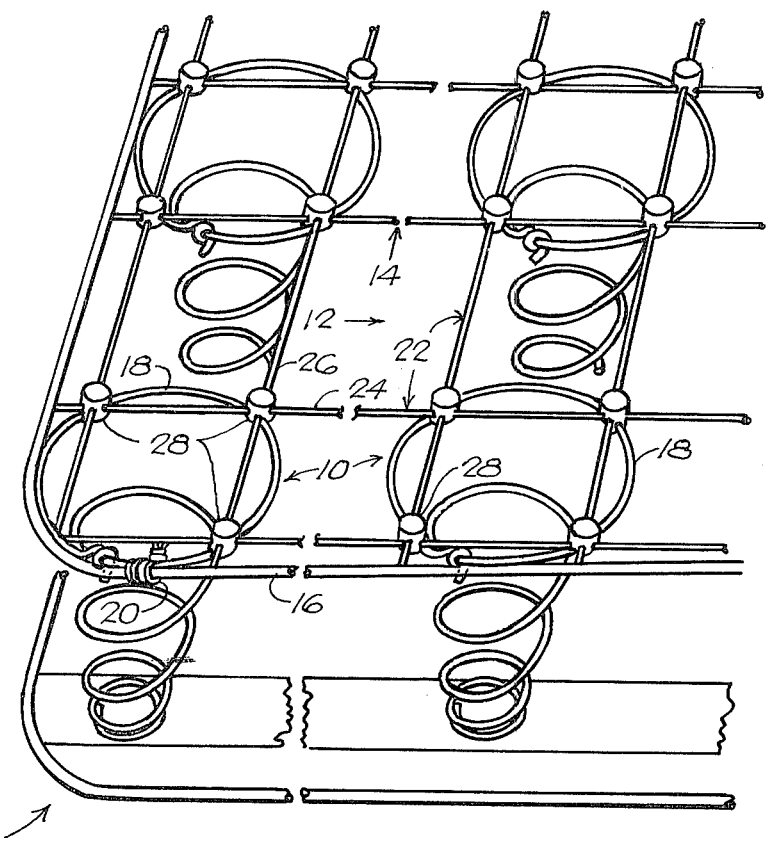

Referring now to the drawings, illustration is made of a spring assembly S formed of a plurality of coil springs 10 arranged in crosswise and lengthwise extending rows 12 and 14. The coil springs are confined within a border wire 16 which lies alongside the terminal coils 18 of the outermost coil springs 10 in the rows and the border wire 16 is joined to the terminal coils of the adjacent coil springs by the helical winding of a tie wire 20, or by clips.

The coil springs are usually formed of multiple coils of spring wires to hourglass shape, conical shape, or cylindrical shape, depending somewhat upon the use of the coil springs, as in a bed spring, mattress, cushion, chair seat, chair backing, and the like.

To retain the coil springs in the aligned crosswise and lengthwise extending rows, use is made of a grid 22 of crosswise and lengthwise extending wires 24 and 26, respectively. Instead of joining the wires by welding at their cross-over points, the wires are joined at their cross-over points by buttons 28 molded in situ of plastic material, such as polyethylene, polypropylene, ethylene-propylene copolymer, tetrafluoroethylene and the like, filled or unfilled plastic material characterized by good dimensional stability, high structural strength, and soft feel.

Before the plastic buttons are molded at the cross-over points to encase the crossing wires, or as a part of the molding operation, the wires at their cross-over points are upset to provide facing curvilinear recessed portions 30 for establishing an interfitting relationship one with the other thereby to militate against relative movement between the wires from their assembled relation at the cross-over points. The interfitted wire members are completely encased within the button 28 with portions of the plastic material filling in between the upset portions thereby completely to intervene between the metal wires, at the cross-over points, to tie the two wires together without metal to metal contact.

Thus the wires 24 and 26 are fully secured one to the other at their cross-over points without the need to employ welding or other metal fastening means. This enables the grid to be formed of wires of high carbon steel, spring steel and the like without deterioration by crystallization of the steel next to the weld, which heretofore restricted the desired use of high carbon steel or spring steels for use in fabrication of the grid.

Further, joinder by such buttons of polyethylene, polypropylene, or copolymers thereof, or polytetrafluoroethylene and the like plastic material eliminates the noise resulting from relative movement of metals in contact one with the other, while providing a means for joinder which is not subject to the failures often experienced with welded joints.

In accordance with a further practice of this invention, the plastic buttons can be adapted to provide the further function of retainers for gripping the terminal portions of the spring elements for releasable attachment to the grid in the desired arrangement. For this purpose the plastic button-retainer is formed with one or more grooves 32 which extend across a portion of the underside of the retainer, which grooves are dimensioned to receive a terminal portion of the spring member in seated relationship therein, with each groove being provided with its own entrant slot 34 extending from the surface of the retainer to the groove with the width of the slot adjacent the groove of smaller dimension than the cross section of the groove and preferably slightly less than the diameter or other cross section of the wire. As a result, when the terminal portion of the spring elements is displaced through the entrant slot 34 into the groove 30, the entrant portion of lesser weight will be resiliently deformed until cleared by the spring wire as it enters into the groove. Thus the terminal portion of the spring member snaps into the assembled relation in the groove and is retained therein until sufficient force is applied for removal or repair of the spring element.

The groove 32 and the contiguous entrant slot 34 are formed to extend curvilinearly through the retainer on an arc corresponding to that of the terminal portion of the spring element when formed of a coil spring or straight across when the terminal portion represents the bail of a torsion spring. The entrant slot is preferably formed of a width that decreases gradually from a width greater than the diameter making up the terminal portion of the coil spring, at the outside, to a width less than the diameter, at the inner portion adjacent the entry into the groove.

The spacing between the grid wires in the lengthwise and crosswise rows is selected to extend as intersecting chords across the terminal coil of a coil spring in the crosswise and lengthwise rows, with the intersecting chords perpendicular to each other. The retainers are formed at the cross-over points with the grooves offset inwardly towards the center of the coil, when offset from the center of the retainer, as in the modification shown in FIGS. 1 to 3, 6 and 7, or aligned with the cross-over points in the modification shown in FIGS. 5 and 6.

The modification shown in FIGS. 3 and 4 makes use of a single groove offset from the main body portion and communicating with the underside in the offset portion. This modification is used where the coil springs are arranged in spaced crosswise and lengthwise rows with four retainers at the cross-over points to support a single coil spring.

A similar modification is shown in FIGS. 4 and 5 wherein the groove is located to extend inwardly from the center of the retainer with the top side of the retainer formed with intersecting lengthwise and crosswise extending slots 40 and 42 for receiving the crosswise and lengthwise extending wires of the grid, after which the base portion is reduced to a plastic state for molding about the inserted cross-over wires of the grid to effect the described interconnected relationship.

The modification shown in FIGS. 5 and 6 is a duplex retainer in which a pair of spaced grooves 44 and 46 of the type previously described extend inwardly from the underside while the top side is formed with the crosswise and lengthwise extending slots 40 and 42, as in FIGS. 4 and 5, for receiving the crosswise and lengthwise extending wires of the grid at their cross-over points. In the tandem arrangement, the segment of one coil spring is received in one groove 44 while the segment of another spring member is received in the other groove 46. This arrangement is used where rows of spring elements are in side by side arrangement, without space in between.

Figure 2:
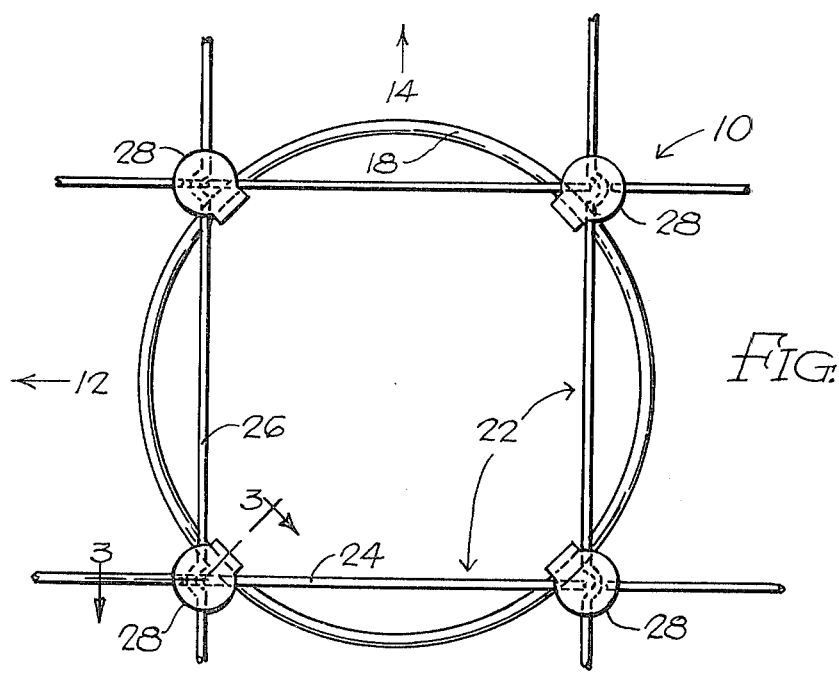
FIG. 2 is an enlarged view showing the arrangement of elements with respect to the assembly of a single coil of a coil spring.

It will be understood that the tandem arrangement of adjacent spaced grooves can be provided in oppositely offset portions of retainer buttons of the type illustrated in FIGS. 1 to 3.

In assembly, the plastic buttons are secured in molded relation at the cross-over points to hold the grid wires in their assembled relation.

When it is desired to assemble the coil springs to the grid, the assembled grid is turned bottom side up on a suitable flat surface. The coil spring is positioned with the terminal coil immediately aligned above the entrant slots to the groove of a group of four buttons. All that remains is to depress the spring to force the portions of the terminal coil through the underlying entrant slot into the grooves. In response to the continued compressive force, the terminal coil portions snap into the groove as they clear the entrant slots thereby to become firmly seated in the assembled relation within the groove. This is repeated until all of the coil springs have been secured in position of use by the retaining buttons.

The grid is thereafter inverted for assembly into the spring unit. The coil springs are suspended from the bottom side of the grid for attachment at their lower ends to slats which are secured at their ends to frame members in the construction of a chair, cushion, bed spring or the like, or interconnected by tie wires to a frame, in a manner well known to the skilled in the art.

It will be apparent that the buttons serve a dual function, namely, to secure the grid wires at their cross-over points to provide an insured, noiseless, non-slip joint, while at the same time providing a simple and effective means for assembly of the spring units in their desired arrangement in the spring assembly.

When, in the modification shown in FIGS. 4 to 7, the plastic material is mechanically or thermally upset to encase the cross-over wires extending through the preformed slots 40 and 42, the grid and the coil springs are merely inserted into the grooves of the retainers. The assembly of the spring unit can be effected manually or mechanically without the need for special expensive tools or highly skilled labor. A spring unit is obtained which is noiseless, free from slippage, and in which the spring elements can be easily removed for replacement or repair.

Figure 8:
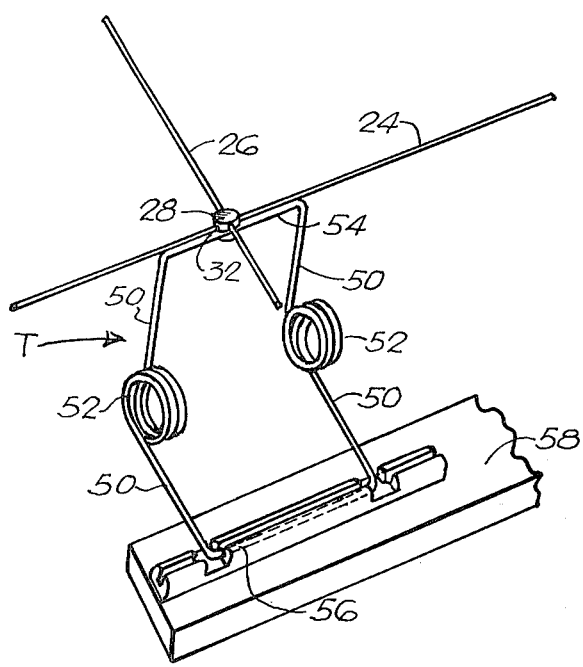
FIG. 8 is a modification of the invention wherein a spring unit is formed with torsion springs.

When, instead of forming the spring assembly of a plurality of coil springs, use is made of torsion springs T, such as formed of a pair of facing U-shaped members 50 joined by torsional loops 52, the grooves 32, 44 or 46 provided in the retainers are arranged preferably to extend straight across to receive the bail portion 54 at one end of the torsion spring while the other bail portion 56 is secured to a slat 58 or the like member forming a part of the frame (not shown), all as illustrated in FIG. 8.

It will be understood that changes may be made in the details of construction, arrangement and operation without departing from the spirit of the invention, especially as defined in the following claims.

I claim:

1. In a spring assembly having a grid formed of a plurality of parallel spaced wires extending in one direction and crisscrossing with a plurality of parallel spaced wires extending in a crosswise direction with the wires closely adjacent one another at their respective cross-over points, and a plurality of spring members having terminal portions and means connecting the terminal portions of the spring members to the grid at cross-over points, the improvement wherein the said means comprises a plastic member which completely encloses the adjacent wires of the grid at cross-over points to fix the wires at the cross-over points, and a groove extending continuously across a portion of the plastic member above the wires and an entrant slot extending from the surface of the plastic member to the groove for guiding the terminal portion of the spring member into gripping relation within the groove.

2. A spring assembly as claimed in claim 1 in which the wires, at their cross-over points, are formed with offsets which are embedded within the plastic member to intertie the embedded wires further to resist relative movement therebetween.

3. A spring assembly as claimed in claim 2 in which the offsets extend in a direction away from each other in the cross-over portions of the wires.

4. A spring assembly as claimed in claim 1 in which the groove corresponds in dimension and shape to a terminal portion of a wire spring member for receipt of a portion thereof in the groove.

5. A spring assembly as claimed in claim 3 in which the entrant slot is defined by walls that converge from the outer end toward the groove to define a passage of decreasing width toward the groove.

6. A spring assembly as claimed in claim 5 in which the width of the entrant slot at the outer portion is greater than the cross section of the groove and in which the width of the entrant slot in the portion adjacent the groove is less than the width of the groove.

7. A spring assembly as claimed in claim 3 in which the spring member is a coil spring formed of spring wire and the terminal portion comprises the terminal coil of the coil spring.

8. A spring assembly as claimed in claim 3 in which the spring member is a torsion spring and the terminal portion comprises a bail of a U-shaped portion of the torsion spring.

9. A spring assembly as claimed in claim 3 in which the plastic member is formed with a pair of grooves and entrant slots for retaining the terminal portions of two separate spring members.

10. A plastic member for use in the spring assembly of claim 1 in which the member is formed with a pair of slots which extend perpendicularly to each other part way into the member for receipt of the cross-over portions of crisscrossing wires of a grid work.

11. A plastic member for use in the spring assembly of claim 3 in which the member is formed with a pair of slots which extend perpendicularly to each other part way into the member and one or more grooves extending across the interior of the member with an entrant slot for each groove extending from the side of the member opposite the slots to the grooves to enable a spring element to be inserted therethrough into the grooves.

12. A plastic member as claimed in claim 11 in which the entrant slots are of decreasing width from the outer surface toward the groove.

13. A plastic member as claimed in claim 12 in which the width of the slot at the outer portion is greater than the cross section of the groove and decreases to a width slightly less than the cross section of the groove in the portion adjacent the groove.

14. A spring assembly as claimed in claim 1 in which the plastic member joins the wires of the grid at their crossover points with the wires out of contact one with another to prevent wire to wire contact in the assembled relation.

* * * * *